(No Model.)
P. B. DONAHOO.
WATERING CART.
No. 426,664. Patented Apr. 29, 1890.
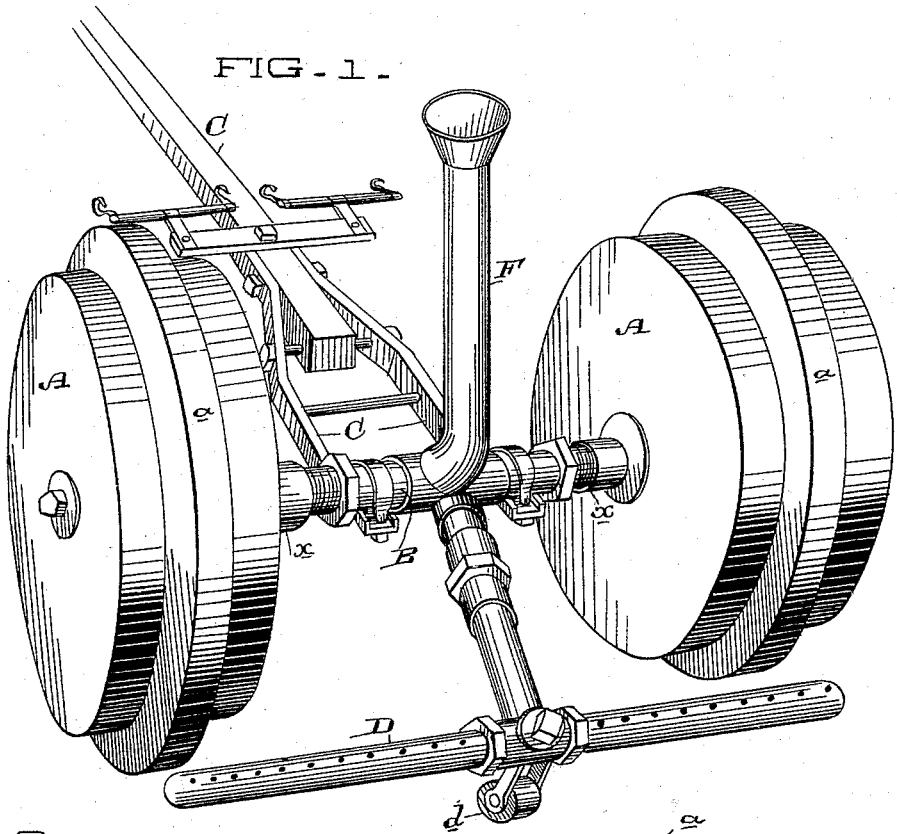
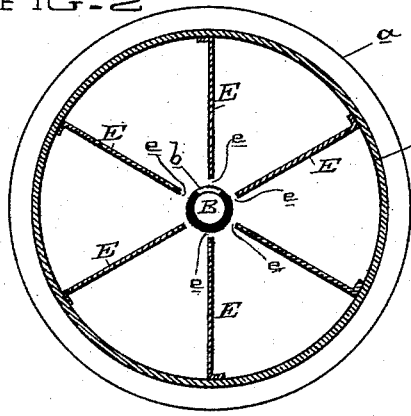
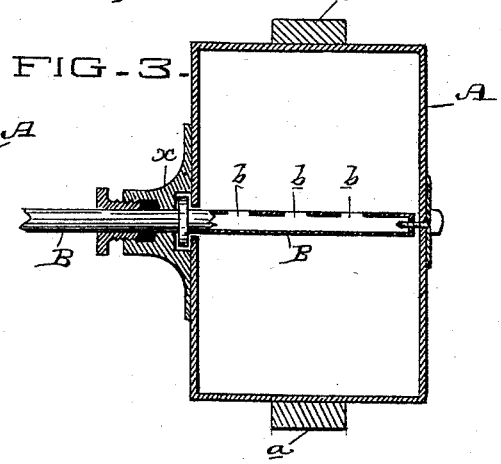
Witnesses,
Inventor
Peter B. Donahoo

UNITED STATES PATENT OFFICE.

PETER B. DONAHOO, OF FRESNO, CALIFORNIA.

WATERING-CART.

SPECIFICATION forming part of Letters Patent No. 426,664, dated April 29, 1890.

Application filed June 24, 1889. Serial No. 315,405. (No model.)

*To all whom it may concern:*

Be it known that I, PETER B. DONAHOO, of the city of Fresno, Fresno county, State of California, have invented an Improvement in Watering-Carts; and I hereby declare the following to be a full, clear, and exact description of the same.

My invention relates to the class of devices for sprinkling streets, roadways, &c., and commonly known as "watering-carts;" and my invention consists in one or more axially-rotary water vessels or receptacles traveling on the ground and provided with draft-connections by which they are drawn, said vessels or receptacles having interior diaphragms or partitions dividing them into compartments. Through these vessels or receptacles passes a pipe having openings in its top, and having connected with its center a perforated discharge or distributing pipe and an inlet-pipe, all of which, together with details of construction, will hereinafter be fully described.

The object of my invention is to provide for a great increase in the capacity of the watering-cart at the same time that its draft is reduced, these objects being attained by avoiding the ordinary wheeled frame upon which the water-receptacle is carried, and employing in its stead one or more axially-rotary water-vessels, which serve as their own wheels.

Referring to the accompanying drawings for a more complete explanation of my invention, Figure 1 is a perspective view of my watering-cart. Fig. 2 is a cross-section of one of the cylinders A. Fig. 3 is a longitudinal section of same.

A are independent cylindrical hollow vessels or receptacles which rest upon the ground, either directly or by tires $a$, as shown. Passing transversely into the centers of these vessels and serving as the axis therefor is a pipe B, having openings $b$ in its top, said pipe entering the vessels through suitable stuffing-boxes at $x$, and having connected with its center the draft-frame C, and communicating at its center with the perforated discharge or distributing pipe D and the feed-inlet pipe F.

Within the vessels or receptacles A are firmly fixed the partitions or diaphragms E, which divide the interior of the vessels into a number of compartments. These project radially and toward the central pipe B, terminating, however, short of it, so as to provide communicating openings $e$ between the compartments. Under the rear center of the sprinkling-pipe D is a small carrying-roller $d$.

The operation of the device is as follows: Water is supplied to the vessels or receptacles through the inlet-pipe F and central pipe B and completely fills all their compartments by passing from one to the other through the communicating openings $e$ at the inner ends of the diaphragms and about the central pipe B. The device being drawn forward, the vessels or receptacles rotate, and as long as the water within them is above the level of the openings $b$ in the top of the pipe B it will pass out through them and be distributed by the perforated sprinkling-pipe D; but when the water gets below the level of the openings in the pipe B it is carried up in the successive compartments by the diaphragms, and as it passes over the top of the pipe B a certain portion of it is discharged into the openings $b$ in the pipe, and this continues as long as the vessels rotate, so that the entire body of water is thus discharged and distributed over the street or roadway.

In ordinary watering-carts a large water-receptacle is used, which is mounted upon a separate wheeled frame, and the draft of the machine is very heavy; but with my device the wheeled frame is dispensed with, the vessels themselves acting as wheels, and consequently said vessels may be made of materially-increased capacity and yet light enough to be drawn readily. A single vessel may be used, if desired.

Having thus described my invention, what I claim as new, and desire to secure by Letters Patent, is—

1. In a watering-cart, the wheels thereof adapted to contain water, and provided with diaphragms on its interior for elevating the same, an inlet-pipe, and a discharge-pipe, with which the interior of the wheels communicate, substantially as described.

2. In a watering-cart, the combination of an axially-rotary vessel or receptacle for containing the water, a pipe passing centrally into said vessel and having openings to admit the water, a distributing-pipe connected with said central pipe, and diaphragms or partitions within the rotary vessel or receptacle for lifting the water to the openings in the central pipe, substantially as described.

3. A watering-cart consisting of the combination of a cylindrical water vessel or receptacle resting and traveling on the ground, whereby it rotates axially, a draft-connection therewith, whereby it is drawn, a central pipe passing into the vessel or receptacle and having openings to admit the water, a distributing-pipe connected with the central pipe, and partitions or diaphragms within the vessel or receptacle, dividing it into compartments, whereby the water is raised by the rotation of the wheel and discharged into the openings of the central pipe, substantially as described.

4. A watering-cart consisting of the combination of the independent rotating cylindrical water vessels or receptacles traveling on the ground, a central pipe with water-openings passing into the vessels or receptacles, a distributing-pipe communicating with the central pipe at a point between the vessels or receptacles, and partitions or diaphragms within the vessels or receptacles for raising the water into the openings of the central pipe, substantially as described.

5. A watering-cart consisting of the combination of the independent rotary cylindrical water vessels or receptacles traveling on the ground, a central pipe with water-openings passing into the vessels or receptacles, a distributing-pipe communicating with the central pipe at a point between the vessels or receptacles, diaphragms or partitions within the vessels or receptacles, dividing them into compartments, and a water-inlet pipe communicating with said central pipe between the vessels or receptacles, substantially as described.

6. The watering-cart consisting of the combination of the independent rotary cylindrical water vessels or receptacles traveling on the ground and having interior diaphragms or partitions dividing them into compartments, a central pipe with water-openings passing into the vessels or receptacles, a distributing-pipe communicating with the central pipe between the vessels or receptacles, a water-inlet pipe communicating with said central pipe between the vessels or receptacles, and a draft-connection with said central pipe, whereby the cart is drawn, substantially as described.

In witness whereof I have hereunto set my hand.

PETER B. DONAHOO.

Witnesses:
S. H. NOURSE,
H. C. LEE.